Oct. 10, 1950     G. E. HAGUE     2,525,220
HYDRAULIC CLUTCH ACTUATOR
Filed Nov. 5, 1947
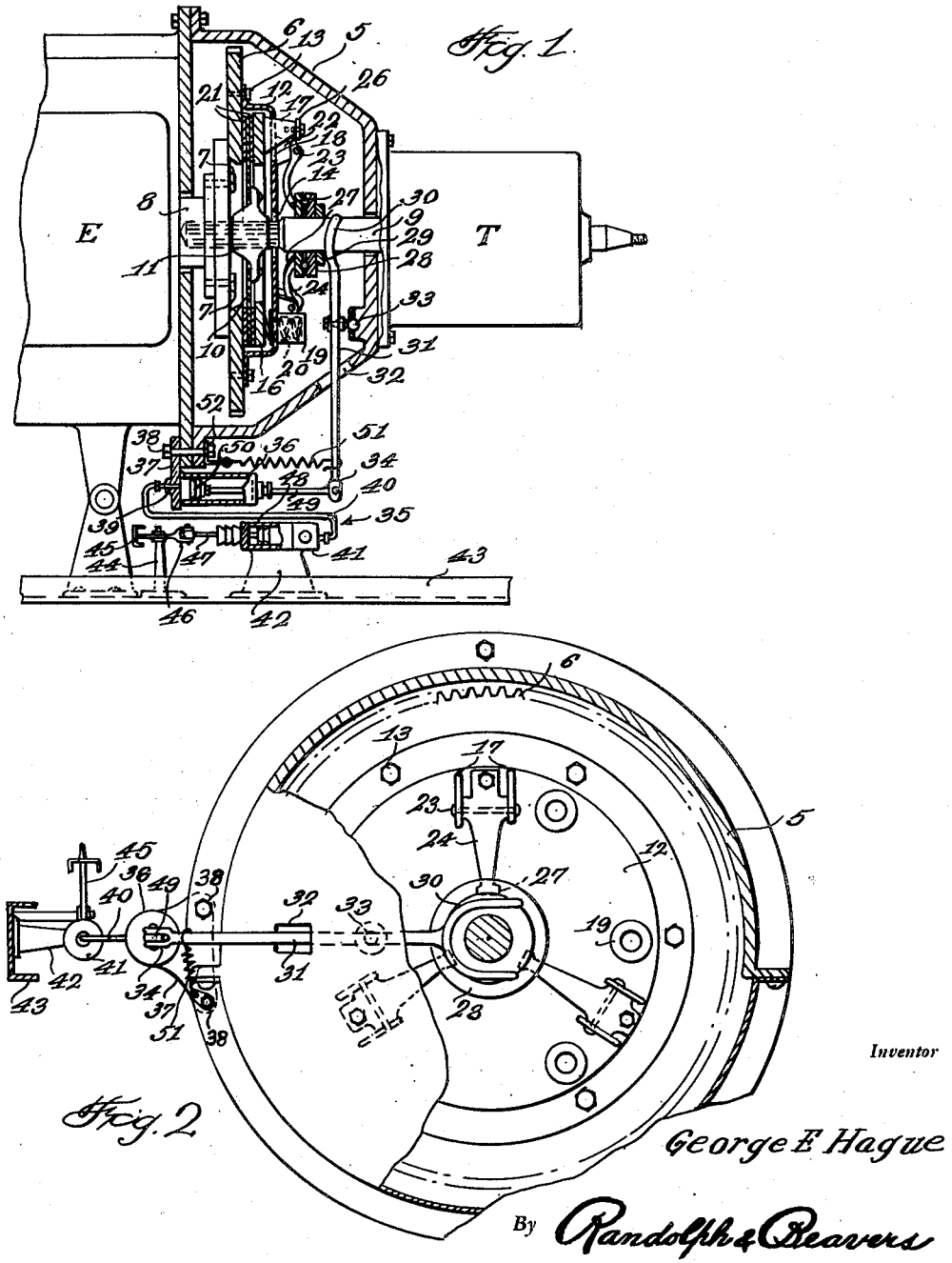
Inventor
*George E. Hague*
By *Randolph & Beavers*
Attorneys Patented Oct. 10, 1950

2,525,220

UNITED STATES PATENT OFFICE 2,525,220

HYDRAULIC CLUTCH ACTUATOR

George E. Hague, Thermopolis, Wyo.

Application November 5, 1947, Serial No. 784,173

3 Claims. (Cl. 192—91)

This invention relates to a hydraulic actuating means for clutches and which is especially adapted for use with motor vehicles and which functions to substantially eliminate or prevent the occurrence of a rough or chattering clutch action which frequently occurs after a clutch has been in use for a considerable period of time and has been subjected to wear.

The present invention constitutes an improvement on my prior co-pending application Serial No. 724,180, filed January 24, 1947, and entitled Hydraulic Clutch Control, now abandoned and is particularly intended to provide a hydraulic actuator which may be utilized in conjunction with the conventional clutches now in common use on popular makes of motor vehicles and for greatly minimizing the foot pressure required on the clutch pedals to release the clutch by interposing between the clutch pedal and the clutch release lever a hydraulic actuating means.

Still another object of the invention is to provide a hydraulic clutch actuator which through minimizing the amount of foot pressure required to release the clutch will enable the use of stronger springs on the clutch pressure plate for more efficiently maintaining the clutch in an engaged position to thereby decrease wear and increase the effective life of the clutch and which will materially enhance the efficient operation of clutches employed in conjunction with internal combustion engines supported on yieldable mountings so that the limited relative movement of the driving and driven elements of the clutch will not adversely affect proper engagement of the clutch parts.

Various other objects and advantages of the invention will hereinafter become more fully apparent from the following description of the drawing, illustrating a preferred embodiment thereof, and wherein:

Figure 1 is a side elevational view, partly in longitudinal section of a conventional clutch equipped with the hydraulic actuator, and Figure 2 is an end elevational view thereof, partly broken away and looking from rear to front of the clutch.

Referring more specifically to the drawings, the numeral 5 designates generally a conventional flywheel housing containing a flywheel 6 which is coupled by fastenings 7 to crank shaft 8 of engine E which extends rotatably into one end of the housing 5. A transmission or driven shaft 9 extends rotatably into the housing 5 from the opposite end thereof from power transmission housing T and has a clutch or driven plate 10 splined at 11 to the inner or forward end thereof.

The clutch or driven plate 10 is enclosed in a housing 12 which is secured by fastenings 13 to the flywheel 6 and which is provided with a central opening 14 to loosely receive the transmission or driven shaft 9. An annular pressure plate or disk 16 is disposed within the housing 12 and on the opposite side of the clutch plate 10 to the flywheel 6. The pressure plate 16 is provided with a plurality of arms or brackets 17 which project from the outer side thereof through slots or openings 18 in the housing 12 and in which said arms or brackets 17 are reciprocally mounted. The housing 12 is provided with a plurality of outwardly projecting inwardly opening sockets 19 each of which is adapted to contain an expansion coiled spring 20, which springs seat in the sockets 19 and bear against the pressure plate 16 for urging the latter into engagement with the clutch or driving plate 10 so that said plate 10 will be clamped between the pressure plate and the adjacent side of the flywheel 6. The flywheel 6 and pressure plate 16 are provided with annular facing strips 21 on their adjacent sides and between which the clutch or driving plate 10 is clamped under the normal action of the springs 20.

The housing 12, on its outer side, is provided with pairs of ears or lugs 22 arranged adjacent each opening 18 thereof and apertured to receive pivot pins 23 for mounting a releasing finger 24 pivotally between each of the pairs of lugs or ears 22. Each of the releasing fingers 24 is provided with a shorter outer end 25 which engages under a head 26 of a bracket or arm 17, and said fingers 24 are provided with opposite inner ends 27 which extend inwardly to adjacent the transmission shaft 9, for a purpose which will hereinafter become apparent.

An anti-friction bearing 28 is disposed on the driven shaft 9 rearwardly of the clutch housing 12 and with the forward sides thereof disposed to bear against the inner end 27 of the releasing fingers 24 and has a washer 29, disposed against the rear side thereof and affording a bearing surface for the forked end 30 of a lever 31 which extends substantially radially from the driven shaft 9 outwardly through an elongated slot 32 in the housing 5 and which is pivotally mounted at 33, adjacent its forked end 30 and within said housing 5 for swinging movement of the ends 30 and 34 of the lever in directions generally longitudinally of the driving and driven shafts 8 and 9.

The parts previously described are of conventional construction and form no part of the present invention. Whereas the clutch structure as previously described is operated by connection of a push rod, not shown, the outer end 34 of the lever 31 being conventionally connected to one end of said push rod and the opposite end thereof being connected to a lever which is actuated by the clutch pedal so that when the clutch pedal, not shown, is depressed the push rod will be moved rearwardly to rock the lever 31 counter-clockwise, as seen in Figure 1 for disengaging the clutch in a conventional manner.

The hydraulic clutch actuator, designated generally 35 and comprising the invention is disposed entirely externally of the clutch housing 5 and requires only replacement of the push rod, previously referred to, with the hydraulic actuator and which includes a cylinder 36 adapted to contain an hydraulic fluid and which is mounted on a bracket 37 which is secured to the clutch housing 5 and externally thereof by one of the clutch housing fastenings 38. A portion of the bracket 37 forms the head of the cylinder 36 and is provided with a port 39 which communicates with the forward end of the cylinder 36 and is connected to one end of a flexible conduit 40, the opposite end of which is in communication with the rear end of a master cylinder 41 also containing an hydraulic fluid and which may be mounted as by means of a bracket 42 on a portion of the frame 43 of a vehicle with which the clutch is associated. A post 44 extends inwardly from the frame 43, forwardly of the bracket 42 and pivotally supports a lever 45, the upper end of which is adapted to be suitably connected to a clutch pedal or clutch pedal actuated element, not shown, so that said upper end will be swung forwardly when the clutch pedal is depressed. The other, lower end of the lever 45 is pivotally connected at 46 to the forward end of a piston rod 47 which extends reciprocally through the forward end of the master cylinder 41 and which is connected to a piston 48 which is reciprocally mounted in said cylinder 41. A piston rod 49 is pivotally connected at its rear end to the head or end 34 of the lever 31 and extends forwardly therefrom reciprocally through the rear end of the cylinder 36 and is connected to a piston 50 which is reciprocally disposed therein.

A contractile coiled spring 51 is anchored adjacent its forward end by an anchor member 52 to one of the fastenings 38 of the housing 5 and is connected at its rear end to the lever 31, adjacent to the end 34 thereof for urging said lever to rock in a clockwise direction so as to hold the fork 30 normally in a retracted position so that the clutch will be held engaged by the action of the springs 20.

It will be readily apparent that when the clutch pedal, not shown, is depressed that the lever 45 will be rocked to cause the lower end thereof to swing rearwardly thereby moving the piston 48 rearwardly in the cylinder 41 for forcing the hydraulic fluid therefrom through the conduit 40 into the cylinder 36 for moving the piston 50 rearwardly or from left to right of Figure 1. The rearward movement of the piston 50 will cause the piston rod 49 to move in the same direction to thereby rock the lever 31 counter-clockwise so that the forked end 30 thereof will move forwardly of the driven shaft 9 for displacing the washer 29 and bearing 28 forwardly. The bearing 28 by being in engagement with the ends 27 of the release fingers 24 will rock said fingers to cause the outer ends thereof to swing away from the clutch plate 10 to thereby retract the pressure plate 16 out of engagement therewith for releasing the clutch.

If pressure on the clutch pedal is released it will return to its normal position causing the lever 45 to rock in the opposite direction to retract the piston 48 forwardly thereby drawing the hydraulic fluid back into the master cylinder 41. At the same time, the spring 51 will retract to rock the lever clockwise for forcing the piston rod 49 and piston 50 forwardly for forcing the hydraulic fluid from the cylinder 36 through the conduit 40 back into the master cylinder 41. The clockwise movement of the lever 31 will cause the forked end 30 thereof to move out of engagement with the washer 29 so that the springs 20 can again project the pressure plate 16 toward the clutch plate 10 for re-engaging the clutch and in so doing will rock the fingers 24 in the opposite direction so that the inner ends 27 thereof in swinging away from the clutch housing 12 will force the bearing 28 and washer 29 rearwardly of the driven shaft 9.

Various modifications and changes are contemplated and may obviously be resorted to, without departing from the spirit or scope of the invention as hereinafter defined by the appended claims.

I claim as my invention:

1. In a vehicle of the type having an assembly comprising an engine, a power transmission, and a clutch housing secured together by a plurality of threaded fastening means, such as bolts or the like, extending into apertures disposed in predetermined relation in the housing, a clutch mechanism in the housing for selectively establishing driving engagement between the engine and transmission, a clutch release lever pivoted to the housing for controlling the clutch mechanism, a clutch pedal, a cylinder having a piston therein connected to the clutch pedal for movement thereby, the improvement which comprises in combination therewith; of a bracket secured to the housing by threaded fastening means extending into at least one of said apertures, the last named fastening means serving to secure the bracket to the housing, and also serving to secure the assembly together, a hydraulic clutch actuator comprising a cylinder having a closed end, the closed end being secured to the bracket, a piston in the actuator cylinder, a piston rod interconnecting the actuator piston and the lever, and a conduit connecting the first named cylinder and the actuator cylinder.

2. A device in accordance with claim 1 wherein the clutch mechanism is provided with a pressure plate and replacement springs for operating same, the replacement springs being constructed to exert a greater force on the pressure plate than springs normally employed.

3. A device in accordance with claim 1 wherein the bracket forms a cylinder head for the actuator cylinder.

GEORGE E. HAGUE.

REFERENCES CITED

The following references are of record in the file of this patent:

UNITED STATES PATENTS

| Number | Name | Date |
|---|---|---|
| 1,823,590 | Christenson | Sept. 15, 1931 |
| 1,861,108 | Brace | May 31, 1932 |
| 2,081,238 | Kelley | May 25, 1937 |
| 2,141,678 | Andres | Dec. 27, 1938 |
| 2,229,055 | Dick | Jan. 21, 1941 |
| 2,405,357 | Jairett | Aug. 6, 1946 |

FOREIGN PATENTS

| Number | Country | Date |
|---|---|---|
| 328,121 | Great Britain | Apr. 24, 1930 |
| 547,465 | Great Britain | Aug. 28, 1942 |
| 662,766 | France | Mar. 25, 1929 |